US012680521B2

(12) United States Patent
Igarashi et al.

(10) Patent No.: US 12,680,521 B2
(45) Date of Patent: Jul. 14, 2026

(54) ABNORMALITY DETERMINATION METHOD FOR PURGE SYSTEM AND ABNORMALITY DETERMINATION SYSTEM FOR PURGE SYSTEM

(71) Applicant: NISSAN MOTOR CO., LTD., Yokohama (JP)

(72) Inventors: Kenichi Igarashi, Kanagawa (JP); Kaito Kitajima, Kanagawa (JP); Ryo Wakabayashi, Kanagawa (JP)

(73) Assignee: NISSAN MOTOR CO., LTD., Yokohama (JP)

( * ) Notice: Subject to any disclaimer, the term of this patent is extended or adjusted under 35 U.S.C. 154(b) by 371 days.

(21) Appl. No.: 18/443,658

(22) Filed: Feb. 16, 2024

(65) Prior Publication Data

US 2024/0280069 A1 Aug. 22, 2024

(30) Foreign Application Priority Data

Feb. 20, 2023 (JP) ................................ 2023-024626

(51) Int. Cl.
*F02M 25/08* (2006.01)

(52) U.S. Cl.
CPC ..... *F02M 25/0809* (2013.01); *F02M 25/0818* (2013.01)

(58) Field of Classification Search
CPC ....................... F02M 25/0809; F02M 25/0818
See application file for complete search history.

(56) References Cited

U.S. PATENT DOCUMENTS 5,494,021 A * 2/1996 Yoneyama ......... F02M 25/0809 123/520
2019/0120716 A1* 4/2019 Murata ............... G01M 3/2876
2020/0256286 A1* 8/2020 Asanuma ............ G01M 3/2815

FOREIGN PATENT DOCUMENTS

JP 2857467 B2 * 2/1999 ......... F02M 25/0809
JP 2017008930 A * 1/2017 ............. F02M 25/08
JP 2019218893 A * 12/2019 ......... F02M 25/0809
JP 2020-133409 A 8/2020
WO WO-2018020923 A1 * 2/2018 ......... F02M 25/0818

(Continued)

OTHER PUBLICATIONS

Machine translation of JP 2017008930 (Year: 2017).*

(Continued)

*Primary Examiner* — Nathaniel J Kolb
(74) *Attorney, Agent, or Firm* — Foley & Lardner LLP

(57) ABSTRACT

An method for determining an abnormality in a passage of a purge system includes: closing an outside air shutoff valve in a state where an output of a purge pump is set to be a high output upon determining that there is a possibility of an abnormality in the passage based on a first diagnosis parameter estimated by closing the outside air shutoff valve in a state where the purge pump is driven; at that time, estimating a second diagnosis parameter that is allowed to be classified into a third region in which it is determined that there is no abnormality in the passage and a fourth region in which it is determined that there is an abnormality in the passage, with a second threshold value as a boundary; and determining that there is an abnormality in the passage when the second diagnosis parameter is included in the fourth region.

10 Claims, 8 Drawing Sheets

(56) References Cited

FOREIGN PATENT DOCUMENTS

WO WO-2018047435 A1 * 3/2018 ............. F02M 25/08

OTHER PUBLICATIONS

Machine translation of JP 2019218893 (Year: 2019).*
Machine translation of JP 2857467 (Year: 1999).*
Machine translation of WO 2018020923 (Year: 2018).*
Machine translation of 2018047435 (Year: 2018).*

* cited by examiner

ABNORMALITY DETERMINATION METHOD FOR PURGE SYSTEM AND ABNORMALITY DETERMINATION SYSTEM FOR PURGE SYSTEM

CROSS REFERENCE TO RELATED APPLICATIONS

This application claims priority based on Japanese Patent Application No. 2023-024626, filed in the Japan Patent Office on Feb. 20, 2023, which is incorporated herein by reference.

FIELD OF THE INVENTION

The present invention relates to an abnormality determination method for a purge system and an abnormality determination system for a purge system.

BACKGROUND OF THE INVENTION

JP 2020-133409 A discloses that, in a purge system that includes a vapor passage connected to a fuel tank, a canister for collecting vaporized fuel transmitted from the fuel tank through the vapor passage, a purge passage including a purge pump for supplying the vaporized fuel absorbed in the canister to an internal combustion engine, and an outside air introduction passage allowing the canister to communicate with outside air and to which an outside air shutoff valve is attached, and that supplies the vaporized fuel collected in the canister to the internal combustion engine by releasing the outside air shutoff valve in a state where the purge pump is driven, an abnormality determination in the purge passage or the vapor passage is performed based on a pressure on an upstream side of the purge pump after the outside air shutoff valve is closed in the state where the purge pump is driven.

However, in JP 2020-133409 A, since an output of the purge pump is increased when the abnormality determination is performed, power consumption is increased accordingly.

An object of the present invention is to provide an abnormality determination method for a purge system and an abnormality determination system for a purge system that reduce an increase in power consumption.

BRIEF SUMMARY OF THE INVENTION

An abnormality determination method for a purge system according to the present invention is an abnormality determination method for a purge system, the purge system including a vapor passage connected to a fuel tank, a canister configured to collect vaporized fuel transmitted from the fuel tank through the vapor passage, a purge passage including a purge pump that supplies the vaporized fuel absorbed in the canister to an internal combustion engine, and an outside air introduction passage allowing the canister to communicate with outside air and to which an outside air shutoff valve is attached, the abnormality determination method being for determining an abnormality in the vapor passage or the purge passage in the purge system. In the abnormality determination method, a first diagnosis parameter is estimated that is a physical quantity which is allowed to be estimated by closing the outside air shutoff valve in a state where the purge pump is driven, and that is allowed to be classified into a first region in which it is determined that there is no abnormality in the vapor passage and the purge passage and a second region in which it is determined that there is a possibility of an abnormality in the vapor passage or the purge passage, with a first threshold value as a boundary. Then, the outside air shutoff valve is released once, an output of the purge pump is set to be a high output higher than an output during estimation of the first diagnosis parameter, and the outside air shutoff valve is closed, when the first diagnosis parameter is included in the second region. In addition, a second diagnosis parameter is estimated that is the physical quantity which is allowed to be estimated by closing the outside air shutoff valve in a state where the output of the purge pump is set to be the high output, and that is allowed to be classified into a third region in which it is determined that there is no abnormality in the vapor passage and the purge passage and a fourth region in which it is determined that there is an abnormality in the vapor passage or the purge passage, with a second threshold value as a boundary. Further, it is determined that there is an abnormality in the vapor passage or the purge passage when the second diagnosis parameter is included in the fourth region.

According to the present invention, in a first abnormality determination, it is determined that there is no abnormality in the vapor passage and the purge passage when the first diagnosis parameter is included in the first region, and it is determined that there is a possibility of an abnormality in the vapor passage or the purge passage when the first diagnosis parameter is included in the second region. Here, when it is determined that there is no abnormality (OK) in the first abnormality determination, since the output of the purge pump is not increased, power consumption can be reduced accordingly. In a second abnormality determination, it is determined that there is no abnormality in the vapor passage and the purge passage when the second diagnosis parameter is included in the third region, and it is determined that there is an abnormality in the vapor passage or the purge passage when the second diagnosis parameter is included in the fourth region. In the second abnormality determination, the output of the purge pump is increased, and thus a presence or absence of an abnormality in the vapor passage and the purge passage can be detected with high accuracy.

BRIEF DESCRIPTION OF DRAWINGS

FIG. 3A is a map showing a relationship between a threshold value used in an abnormality determination and a filling rate of a fuel tank, in which FIG. 3A shows a relationship between a space volume threshold value ($V_{TH1}$, $V_{TH2}$) and the filling rate.

FIG. 3B is a map showing a relationship between a threshold value used in an abnormality determination and a filling rate of a fuel tank, in which FIG. 3B shows a relationship between a pressure threshold value ($P_{TH1}$, $P_{TH2}$) and the filling rate.

FIG. 3C is a map showing a relationship between a threshold value used in an abnormality determination and a filling rate of a fuel tank, in which FIG. 3C shows a relationship between a pressure decrease rate threshold value ($(d/dt)(P_{TH1})$, $(d/dt)(P_{TH2})$) and the filling rate.

DETAILED DESCRIPTION OF THE INVENTION

Hereinafter, an embodiment of the present invention will be described with reference to the accompanying drawings.

[Basic Configuration of Engine System]

Figure 1:
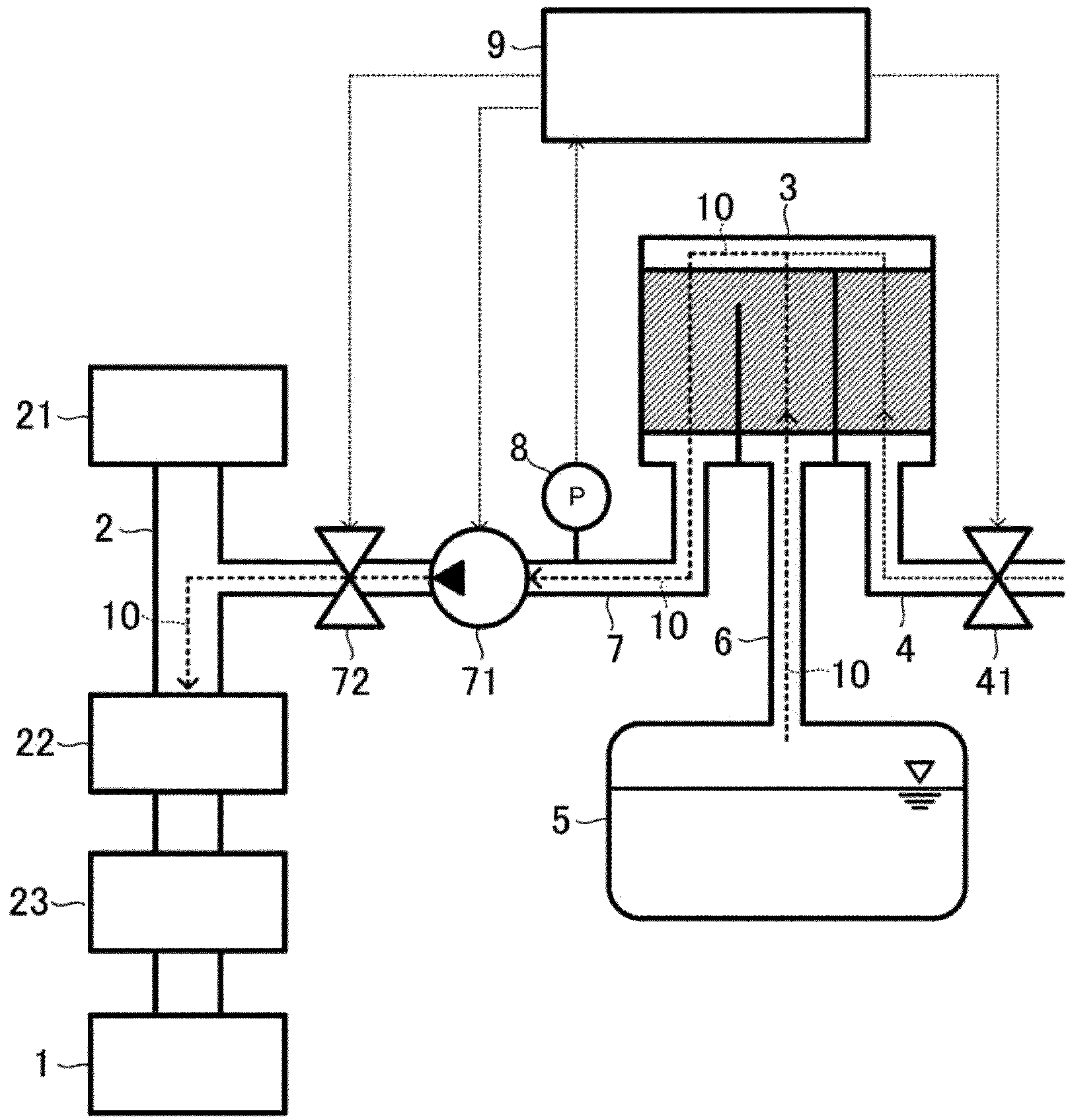
FIG. 1 is a diagram showing an overall configuration of an engine system to which an abnormality determination system (abnormality determination method) for a purge system of the present embodiment is applied.

FIG. 1 is a diagram showing an overall configuration of an engine system to which an abnormality determination system (abnormality determination method) for a purge system of the present embodiment is applied. The abnormality determination system for the purge system of the present embodiment is mounted on a vehicle such as an automatic vehicle. As shown in FIG. 1, the engine system includes an engine 1, an intake passage 2, an air cleaner 21, a supercharger 22, a throttle valve 23, and a fuel tank 5.

The intake passage 2 is a passage for supplying outside air to a combustion chamber of the engine 1.

The air cleaner 21 is disposed at an opening portion of the intake passage 2, removes a foreign matter contained in the outside air, and introduces the outside air from which the foreign matter is removed into the intake passage 2.

The supercharger 22 includes a turbine (not shown) that rotates with an exhaust gas of the engine 1, and a compressor (not shown) that rotates with the rotation of the turbine to supply the outside air to an engine 1 side.

The throttle valve 23 adjusts a flow rate of the outside air based on an amount of depression (accelerator opening) of an accelerator pedal by a driver.

The purge system incorporated into the engine system includes a canister 3, an outside air introduction passage 4, an outside air shutoff valve 41, a vapor passage 6, a purge passage 7, a purge pump 71, and a purge valve 72.

The vapor passage 6 allows the canister 3 to communicate with an upper portion of the fuel tank 5.

The canister 3 communicates with the upper portion of the fuel tank 5 through the vapor passage 6, and temporarily collects vaporized fuel flowing from the fuel tank 5 through the vapor passage 6 in a filling material (for example, activated coal) in the canister 3.

The outside air introduction passage 4 allows the canister 3 to communicate with the outside air.

The outside air shutoff valve 41 opens the outside air introduction passage 4 when the vaporized fuel is supplied to the intake passage 2 as described later, but closes the outside air introduction passage 4 when an abnormality determination of the purge system is performed.

The purge passage 7 allows the canister 3 to communicate with the intake passage 2 (position between the air cleaner 21 and the supercharger 22). Therefore, the vapor passage 6, the canister 3, and the purge passage 7 form a supply passage 10 for supplying the vaporized fuel from the fuel tank 5 to the supercharger 22 (intake passage 2).

The purge pump 71 is disposed in the purge passage 7. When the purge pump 71 is driven in a state where the outside air shutoff valve 41 is released, the outside air is introduced into the canister 3 from the outside air introduction passage 4, the outside air pushes out the vaporized fuel collected in the filling material, and is introduced into the intake passage 2 (combustion chamber of the engine 1) by passing through the purge passage 7 together with the vaporized fuel.

The purge valve 72 is disposed downstream of the purge pump 71 in the purge passage 7. The purge valve 72 normally releases the purge passage 7, but an opening thereof is narrowed to a prescribed opening when the abnormality determination of the purge system to be described later is performed. Accordingly, a flow rate of the vaporized fuel flowing out of the purge valve 72 (purge pump 71) can be made substantially constant during the abnormality determination. The purge valve 72 may be omitted if the flow rate of the vaporized fuel flowing out of the purge valve 72 (purge pump 71) is substantially constant during the abnormality determination even if the purge valve 72 is released.

A pressure sensor 8 detects a pressure in the purge passage 7. The purge passage 7 communicates with the vapor passage 6 through the canister 3. Therefore, the pressure in the purge passage 7 corresponds to a pressure in the vapor passage 6.

Although not shown, the present embodiment includes a level gauge sensor that detects a filling rate of a liquid fuel filled in the fuel tank 5. The level gauge sensor detects the filling rate of the liquid fuel by detecting, for example, a height of a float floating on a liquid surface of the liquid fuel as a sensor value.

When the liquid fuel is shaken, the float oscillates in a height direction in conjunction with an oscillation of the liquid surface of the liquid fuel, and the sensor value of the level gauge sensor also oscillates in conjunction with an oscillation of the float in the height direction.

A controller 9 is a computer including a central processing unit (CPU), a read-only memory (ROM), a random access memory (RAM), an input/output interface (I/O interface), and the like, and constitutes a part of a control device of the vehicle. The controller 9 appropriately controls each constituent element (for example, the purge pump 71, the purge valve 72, and the outside air shutoff valve 41) based on a program for executing the abnormality determination system (abnormality determination method) for the purge system of the present embodiment. The pressure detected by the pressure sensor 8 and the sensor value (filling rate of the liquid fuel) detected by the level gauge sensor are input to the controller 9.

In the abnormality determination system for the purge system of the present embodiment, an abnormality determination is performed to detect clogging of the vapor passage 6 or the purge passage 7 based on a difference between a state before and a state after the outside air shutoff valve 41 is closed in a state where the purge pump 71 is driven (physical quantity related to the purge passage 7 that can be estimated by closing the outside air shutoff valve 41).

For example, a space volume of the fuel tank 5 (gas phase region), the vapor passage 6, the canister 3, and the purge passage 7 (portion on an upstream side of the purge pump 71) is estimated as a first diagnosis parameter based on a flow rate (F) of the purge pump 71 until a prescribed time elapses after the outside air shutoff valve 41 is closed, a pressure ($P_0$) of the purge passage 7 before the outside air shutoff valve 41 is closed, and a pressure ($P_C$) when the prescribed time elapses after the outside air shutoff valve 41 is closed. Here, the space volume can be estimated by K×flow rate (F)/($P_0$−$P_C$). Here, K is any constant and is determined in advance by an experiment. The flow rate (F) can be estimated based on a product of a rotation speed of the purge pump 71 and the prescribed time.

For example, when the clogging occurs in the vapor passage 6, the space volume becomes smaller by an amount corresponding to an absence of a component of the fuel tank 5 (gas phase region), which is reflected in a decrease of the pressure ($P_C$). Therefore, when an estimated space volume is smaller than a prescribed threshold value, it can be determined that the clogging occurs in the purge passage 7 or the vapor passage 6.

Here, the component of the fuel tank 5 (gas phase region) in the space volume becomes smaller as the filling rate of the liquid fuel with which the fuel tank 5 is filled becomes higher. Therefore, the threshold value to be compared with the space volume is set to be smaller as the filling rate of the liquid fuel becomes higher.

An output of the purge pump 71 when the vaporized fuel collected in the canister 3 is supplied to the intake passage 2 is kept relatively low. Therefore, even if the outside air shutoff valve 41 is closed in a state where the output is maintained, a sufficient pressure decrease amount cannot be obtained in the purge passage 7, and it may be difficult to clearly identify a presence or absence of clogging. In this case, a threshold value for the space volume is appropriately set, and a case where the clogging does not occur is also included even if a value smaller than the threshold value is calculated. Therefore, the threshold value (first threshold value) is set to a value that is a lower limit of the space volume (pressure decrease) at which it can be determined that the clogging does not occur at least, and the estimated space volume (first diagnosis parameter) is compared with the first threshold value. It is determined that there is no abnormality when the space volume is included in a first region equal to or larger than the first threshold value, and it is temporarily determined that there is an abnormality, that is, there is a possibility of an abnormality when the space volume is included in a second region smaller than the first threshold value (determination that the clogging occurs once).

On the other hand, when the output of the purge pump 71 is increased, the sufficient pressure decrease amount can be obtained in the purge passage 7, and thus a threshold value (second threshold value) for clearly identifying the presence or absence of clogging can be set. At this time, the second threshold value can be set to a value smaller than the first threshold value. In this case, it is possible to estimate the space volume as a second diagnosis parameter, compare the space volume with the second threshold value, determine that there is no abnormality when the space volume is equal to or larger than the second threshold value, and determine that there is an abnormality when the space volume is smaller than the second threshold value.

For example, in a case where the output of the purge pump 71 is set to be a low output as described above and a space volume ($V_{C1}$) is applied as the first diagnosis parameter (estimated value), a distribution range of the first diagnosis parameter when the system (vapor passage 6 and purge passage 7) is normal and a distribution range of the first diagnosis parameter when the system (vapor passage 6 or purge passage 7) is abnormal are widened, so that the distribution ranges partially overlap each other. At this time, a minimum value of the first diagnosis parameter that can be obtained when the system is normal is smaller than a maximum value of the first diagnosis parameter that can be obtained when the system is abnormal. Therefore, in order to avoid an erroneous determination that the system is normal when the system is abnormal, a first threshold value ($V_{TH1}$) is set to be a value larger than the maximum value of the first diagnosis parameter that can be obtained when the system is abnormal.

On the other hand, in a case where the output of the purge pump 71 is set to be a high output as described above and a space volume ($V_{C2}$) is applied as the second diagnosis parameter, a distribution range of the second diagnosis parameter when the system (vapor passage 6 and purge passage 7) is normal and a distribution range of the second diagnosis parameter when the system (vapor passage 6 or purge passage 7) is abnormal are narrowed, so that the distribution ranges do not overlap each other. That is, a minimum value of the second diagnosis parameter that can be obtained when the system is normal is larger than a maximum value of the second diagnosis parameter that can be obtained when the system is abnormal. Therefore, even if a second threshold value ($V_{TH2}$) is set to be the same value as the first threshold value ($V_{TH1}$), the erroneous determination of the abnormality determination of the system can be avoided. The second threshold value ($V_{TH2}$) may be set to be a value smaller than the first threshold value ($V_{TH1}$) and larger than the maximum value of the second diagnosis parameter that can be obtained when the system is abnormal.

As described above, in the present embodiment, when the space volume ($V_{C1}$) estimated in a first abnormality determination is equal to or larger than the first threshold value ($V_{TH1}$), it is determined that there is no abnormality, and when the space volume ($V_{C1}$) is smaller than the first threshold value ($V_{TH1}$), it is temporarily determined that there is an abnormality, and a second abnormality determination is performed. The second abnormality determination is performed by increasing the output (rotation speed) of the purge pump 71 and setting the threshold value of the space volume to be the second threshold value ($V_{TH2}$) smaller than the first threshold value ($V_{TH1}$). When the space volume ($V_{C2}$) estimated for a second time is equal to or larger than the second threshold value ($V_{TH2}$), it is determined that there is no abnormality, and when the space volume ($V_{C2}$) is smaller than the second threshold value ($V_{TH2}$), it is formally determined that there is an abnormality in the supply passage 10 (the vapor passage 6 or the purge passage 7 is clogged).

Therefore, when it is determined that there is no abnormality in the first determination, it is not necessary to increase the output (rotation speed) of the purge pump 71, and thus power consumption can be reduced accordingly.

As described above, in the present embodiment, a space volume ($V_C$) is applied as a diagnosis parameter (physical quantity) used in the abnormality determination, and the pressure ($P_C$) detected by the pressure sensor 8 when the prescribed time elapses after the outside air shutoff valve 41 is closed and a decrease rate ($(d/dt)(P_C)$) of the pressure ($P_C$) (time differential of the pressure ($P_C$)) detected by the pressure sensor 8 after the outside air shutoff valve 41 is closed are applied as other diagnosis parameters.

In a case where the pressure ($P_C$) after the prescribed time elapses since the outside air shutoff valve 41 is closed is applied as a diagnosis parameter (physical quantity), when a pressure ($P_{C1}$) (first diagnosis parameter) measured in the first abnormality determination is equal to or larger than a first threshold value ($P_{TH1}$), it is determined that there is no abnormality, and when the pressure ($P_{C1}$) is smaller than the first threshold value ($P_{TH1}$), it is temporarily determined that there is an abnormality, and the second abnormality determination is performed. The second abnormality determination is performed by increasing the output (rotation speed) of the purge pump 71 and setting a threshold value of the pressure to be a second threshold value ($P_{TH2}$) smaller than the first threshold value ($P_{TH1}$). When a pressure ($P_{C2}$) (second diagnosis parameter) measured for a second time is equal to or larger than the second threshold value ($P_{TH2}$), it is determined that there is no abnormality, and when the pressure ($P_{C2}$) is smaller than the second threshold value ($P_{TH2}$), it is formally determined that there is an abnormality in the supply passage 10.

In a case where the decrease rate ($(d/dt)(P_C)$) of the pressure ($P_C$) after the outside air shutoff valve 41 is closed is applied as a diagnosis parameter (physical quantity), when a decrease rate ($(d/dt)(P_{C1})$) (first diagnosis parameter) measured in the first abnormality determination is equal to or smaller than a first threshold value ($(d/dt)(P_{TH1})$), it is determined that there is no abnormality, and when the decrease rate ($(d/dt)(P_{C1})$) is larger than the first threshold value ($P_{TH1}$), it is temporarily determined that there is an abnormality, and the second abnormality determination is performed. The second abnormality determination is performed by increasing the output (rotation speed) of the purge pump 71 and setting a threshold value of the decrease rate to be a second threshold value ($(d/dt)(P_{TH2})$) larger than the first threshold value ($(d/dt)(P_{TH1})$). When a decrease rate ($(d/dt)(P_{C2})$) (second diagnosis parameter) measured for a second time is equal to or smaller than the second threshold value ($P_{TH2}$), it is determined that there is no abnormality, and when the decrease rate ($(d/dt)(P_{C2})$) is larger than the second threshold value ($(d/dt)(P_{TH2})$), it is formally determined that there is an abnormality in the supply passage 10.

The abnormality determination of the present embodiment can also be performed when the engine 1 is driven and the vehicle is traveling. Accordingly, it is possible to increase an opportunity to perform the abnormality determination. When the fluctuation of the liquid fuel is large, the liquid fuel may enter the vapor passage 6 to close the vapor passage 6, making it difficult to calculate and measure the above diagnosis parameters, and it may be determined that “there is an abnormality” in the purge system even if “there is no abnormality” actually. Therefore, in the present embodiment, when an oscillation of the sensor value detected by the level gauge sensor exceeds a prescribed upper limit value, that is, when the fluctuation of the liquid fuel in the fuel tank 5 is equal to or larger than a prescribed upper limit value, it is determined that the liquid fuel may close the vapor passage 6, and the abnormality determination is prohibited. Accordingly, the erroneous determination of the abnormality determination can be reduced.

[Control Block]

Figure 2:
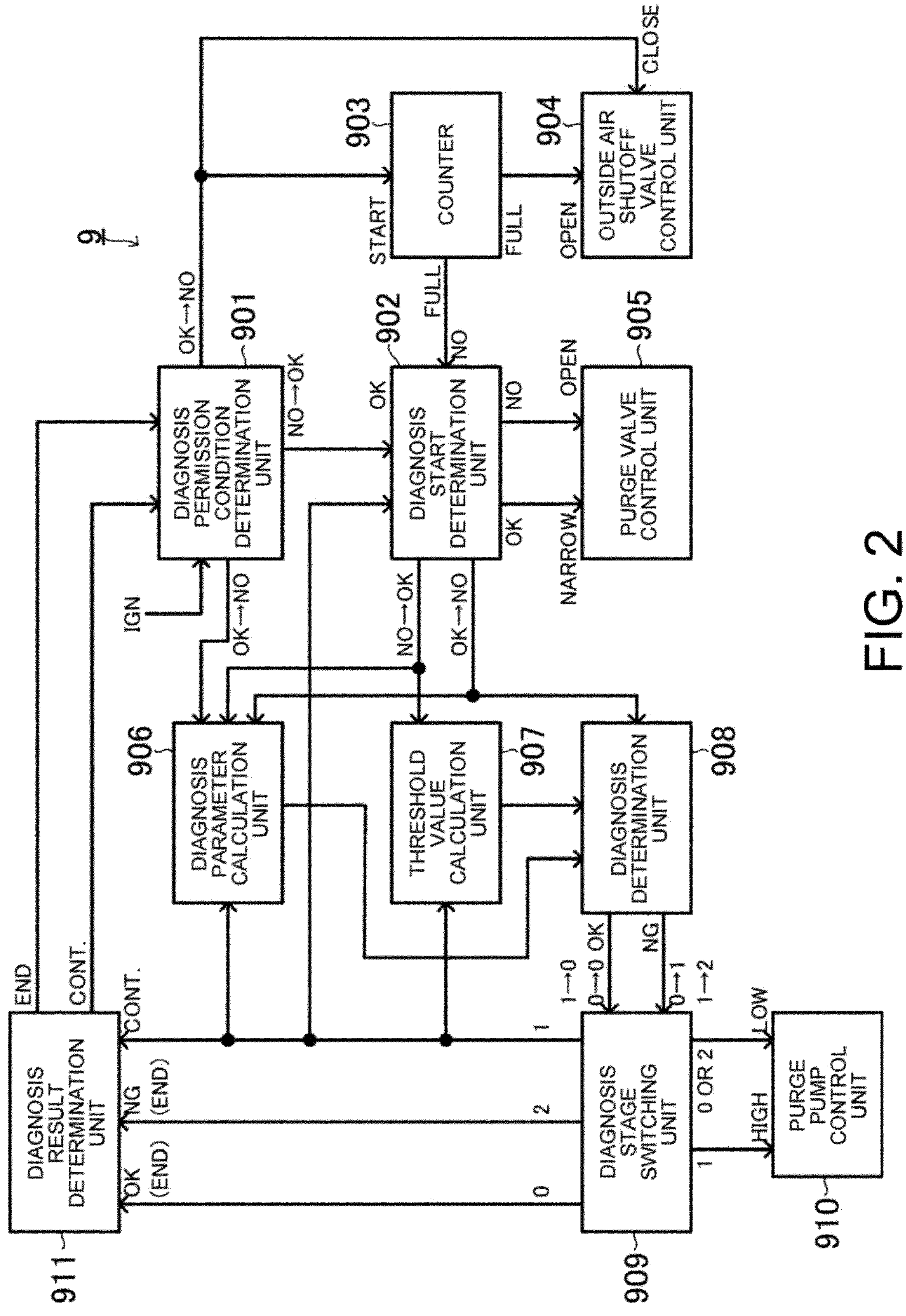
FIG. 2 is a control block diagram of the abnormality determination system for the purge system of the present embodiment.
Figure 3A:
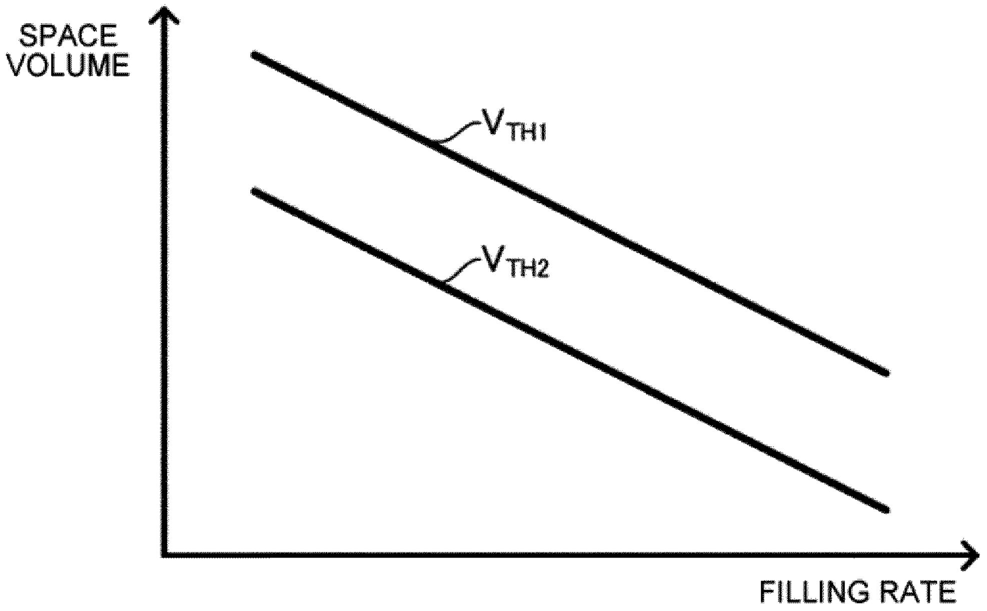
Figure 3B:
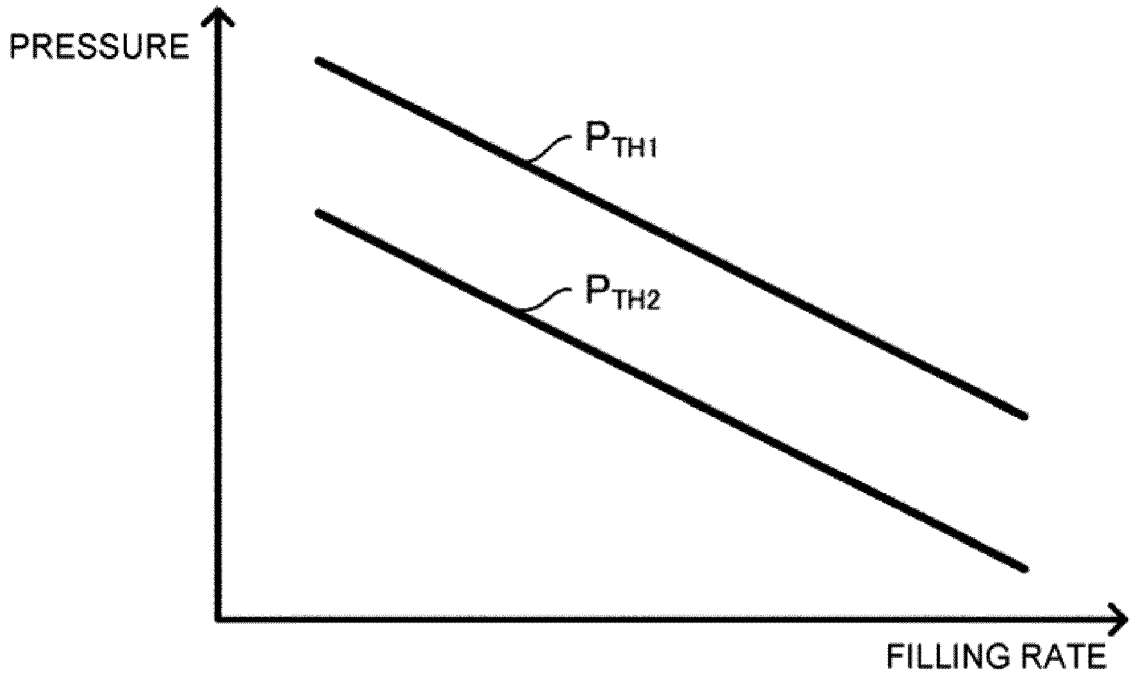
Figure 3C:
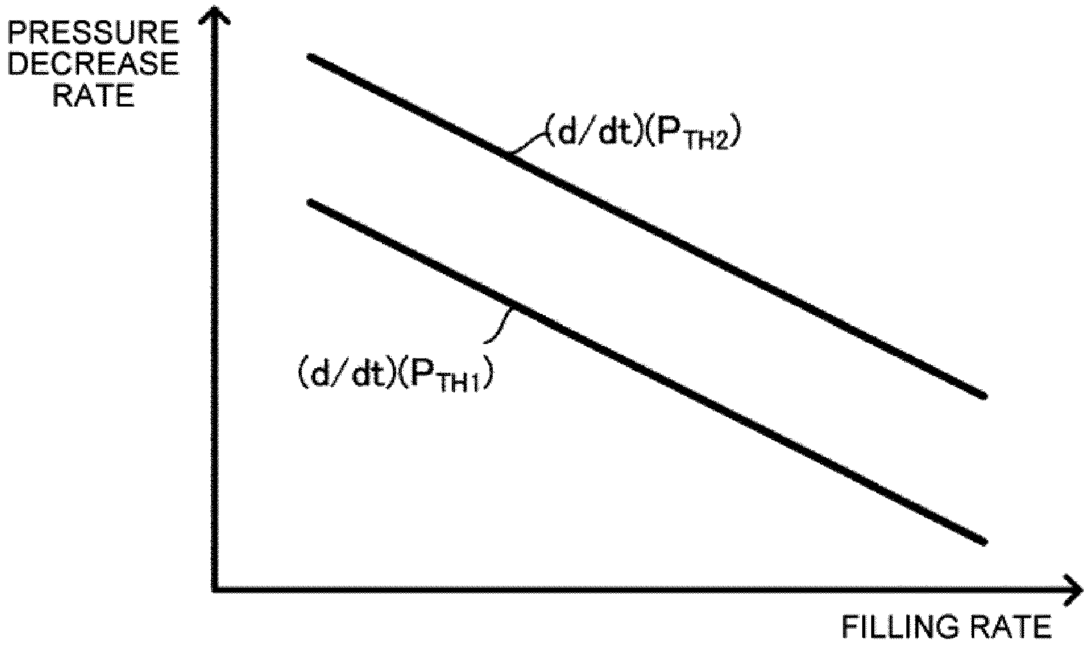

FIG. 2 is a control block diagram of the abnormality determination system for the purge system of the present embodiment. FIG. 3A is a map showing a relationship between a threshold value used in an abnormality determination and a filling rate of a fuel tank, in which FIG. 3A shows a relationship between a space volume threshold value ($V_{TH1}$, $V_{TH2}$) and the filling rate. FIG. 3B is a map showing a relationship between a threshold value used in an abnormality determination and a filling rate of a fuel tank, in which FIG. 3B shows a relationship between a pressure threshold value ($P_{TH1}$, $P_{TH2}$) and the filling rate. FIG. 3C is a map showing a relationship between a threshold value used in an abnormality determination and a filling rate of a fuel tank, in which FIG. 3C shows a relationship between a pressure decrease rate threshold value ($(d/dt)(P_{TH1})$, $(d/dt)(P_{TH2})$) and the filling rate.

In order to execute the abnormality determination system (abnormality determination method) for the purge system of the present embodiment, the controller 9 includes a diagnosis permission condition determination unit 901, a diagnosis start determination unit 902, a counter 903, an outside air shutoff valve control unit 904, a purge valve control unit 905, a diagnosis parameter calculation unit 906, a threshold value calculation unit 907, a diagnosis determination unit 908, a diagnosis stage switching unit 909, a purge pump control unit 910, and a diagnosis result determination unit 911.

The diagnosis permission condition determination unit 901 outputs a diagnosis permission condition flag (NO) in an initial state. For example, when an ignition signal (IGN) indicating the start of the engine 1 is input, the diagnosis permission condition determination unit 901 outputs a diagnosis permission condition flag (OK) when a prescribed condition is satisfied (for example, a rotation speed of the engine 1 and the rotation speed of the purge pump 71 reach prescribed rotation speeds, respectively). After outputting the diagnosis permission condition flag (OK), the diagnosis permission condition determination unit 901 outputs the diagnosis permission condition flag (NO) when a prescribed time (time for measuring the pressure ($P_0$)) elapses.

When the diagnosis permission condition flag (OK) output by the diagnosis permission condition determination unit 901 is switched to the diagnosis permission condition flag (NO), the counter 903 starts counting up, and when a full count is reached, the counter 903 outputs a carry (FULL) and resets a count value. A time from the start of the counting up to the full count is, for example, a prescribed time (time t3–time t2 in FIG. 5) necessary to calculate a space volume to be described later.

The diagnosis start determination unit 902 outputs a diagnosis start flag (NO) in the initial state, but outputs a diagnosis start flag (OK) when the diagnosis permission condition flag (NO) output by the diagnosis permission condition determination unit 901 is switched to the diagnosis permission condition flag (OK).

In a case where a diagnosis stage signal (1) is input from the diagnosis stage switching unit 909, when the diagnosis permission condition flag (NO) output by the diagnosis permission condition determination unit 901 is switched to the diagnosis permission condition flag (OK), the diagnosis start determination unit 902 outputs the diagnosis start flag (OK) after a prescribed time (time from when the output (rotation speed) of the purge pump 71 is increased to when the output (rotation speed) converges) elapses from a switching timing.

When the carry (FULL) is input from the counter 903, the diagnosis start determination unit 902 outputs the diagnosis start flag (NO).

When the diagnosis start flag (NO) output by the diagnosis start determination unit 902 is switched to the diagnosis start flag (OK) (time t1 in FIG. 5), the diagnosis parameter calculation unit 906 measures the pressure ($P_0$) detected by the pressure sensor 8. Thereafter, when the diagnosis permission condition flag (OK) output by the diagnosis permission condition determination unit 901 is switched to the diagnosis permission condition flag (NO) (time t2 in FIG. 5), information on the pressure ($P_0$) is stored, and measurement of the pressure ($P_{C1}$) is started. Here, the pressure ($P_0$) becomes a maximum value measured from the time t1 to the time t2.

The outside air shutoff valve control unit 904 opens the outside air shutoff valve 41 in the initial state. When the diagnosis permission condition flag (OK) output by the diagnosis permission condition determination unit 901 is switched to the diagnosis permission condition flag (NO), the outside air shutoff valve control unit 904 performs a control (CLOSE) for closing the outside air shutoff valve 41, and then performs a control (OPEN) for opening the outside air shutoff valve 41 when the carry (FULL) is input from the counter 903.

The purge valve control unit 905 opens the purge valve 72 in the initial state. When the diagnosis start flag (NO) output by the diagnosis start determination unit 902 is switched to the diagnosis start flag (OK), a control (NARROW) for narrowing the purge valve 72 to a prescribed opening is performed. Thereafter, when the diagnosis start flag (OK) output by the diagnosis start determination unit 902 is switched to the diagnosis start flag (NO), the purge valve control unit 905 performs the control (OPEN) for opening the purge valve 72.

When the diagnosis start flag (OK) output by the diagnosis start determination unit 902 is switched to the diagnosis start flag (NO) (time t3 in FIG. 5), the diagnosis parameter calculation unit 906 stores the pressure ($P_{C1}$) during the switching.

When the space volume is applied as the first diagnosis parameter, the diagnosis parameter calculation unit 906 calculates the space volume ($V_{C1}$) and outputs the space volume ($V_{C1}$) to the diagnosis determination unit 908. When the pressure ($P_{C1}$) is applied as the first diagnosis parameter, the diagnosis parameter calculation unit 906 outputs the pressure ($P_{C1}$) to the diagnosis determination unit 908. Further, when a decrease rate of the pressure ($P_{C1}$) is applied as the first diagnosis parameter, the diagnosis parameter calculation unit 906 outputs the decrease rate ((d/dt)($P_{C1}$)) to the diagnosis determination unit 908. The decrease rate may be calculated by ($P_0$−$P_{C1}$(time t3))/(time t3−time t2), or a time differential of the pressure ($P_{C1}$) immediately after the time t2 may be calculated.

When the diagnosis stage signal (1) is input from the diagnosis stage switching unit 909, the diagnosis parameter calculation unit 906 measures and records the pressure ($P_{C2}$) instead of the pressure ($P_{C1}$). When the space volume ($V_{C2}$) is applied as the second diagnosis parameter, the diagnosis parameter calculation unit 906 calculates the space volume ($V_{C2}$) and outputs the space volume ($V_{C2}$) to the diagnosis determination unit 908. In addition, when the pressure ($P_{C2}$) is applied as the second diagnosis parameter, the diagnosis parameter calculation unit 906 outputs the pressure ($P_{C2}$) to the diagnosis determination unit 908. Further, when a decrease rate of the pressure ($P_{C2}$) is applied as the second diagnosis parameter, the diagnosis parameter calculation unit 906 outputs the decrease rate ((d/dt)($P_{C2}$)) to the diagnosis determination unit 908. The decrease rate may be calculated by ($P_0$-$P_{C2}$ (time t3))/(time t3−time t2), or a time differential of the pressure ($P_{C2}$) immediately after the time t2 may be calculated.

When the diagnosis start flag (NO) output by the diagnosis start determination unit 902 is switched to the diagnosis start flag (OK), the threshold value calculation unit 907 outputs a first threshold value (TH1) to be compared with the diagnosis parameter to the diagnosis determination unit 908.

When the space volume ($V_{C1}$) is applied as the first diagnosis parameter, the threshold value calculation unit 907 calculates the space volume threshold value ($V_{TH1}$) based on the map shown in FIG. 3A and the filling rate of the fuel tank 5, and outputs the space volume threshold value ($V_{TH1}$) to the diagnosis determination unit 908.

When the pressure ($P_{C1}$) is applied as the first diagnosis parameter, the threshold value calculation unit 907 calculates the pressure threshold value ($P_{TH1}$) based on the map shown in FIG. 3B and the filling rate of the fuel tank 5, and outputs the pressure threshold value ($P_{TH1}$) to the diagnosis determination unit 908.

When the decrease rate ((d/dt)($P_{C1}$)) of the pressure is applied as the first diagnosis parameter, the threshold value calculation unit 907 calculates the decrease rate threshold value ((d/dt)($P_{TH1}$)) based on the map shown in FIG. 3C and the filling rate of the fuel tank 5, and outputs the decrease rate threshold value ((d/dt)($P_{TH1}$) to the diagnosis determination unit 908.

In a case where the diagnosis stage signal (1) is input from the diagnosis stage switching unit 909, when the flag (NO) output by the diagnosis start determination unit 902 is switched to the flag (OK), the threshold value calculation unit 907 outputs a second threshold value (TH2) to be compared with the diagnosis parameter to the diagnosis determination unit 908.

When the space volume ($V_{C2}$) is applied as the second diagnosis parameter, the threshold value calculation unit 907 calculates the space volume threshold value ($V_{TH2}$) based on the map shown in FIG. 3A and the filling rate of the fuel tank 5, and outputs the space volume threshold value ($V_{TH2}$) to the diagnosis determination unit 908.

When the pressure ($P_{C2}$) is applied as the second diagnosis parameter, the threshold value calculation unit 907 calculates the pressure threshold value ($P_{TH2}$) based on the map shown in FIG. 3B and the filling rate of the fuel tank 5, and outputs the pressure threshold value ($P_{TH2}$) to the diagnosis determination unit 908.

When the decrease rate ((d/dt)($P_{C2}$)) of the pressure ($P_{C2}$) is applied as the second diagnosis parameter, the threshold value calculation unit 907 calculates the decrease rate threshold value ((d/dt)($P_{TH2}$)) based on the map shown in FIG. 3C and the filling rate of the fuel tank 5, and outputs the decrease rate threshold value ((d/dt)($P_{TH2}$)) to the diagnosis determination unit 908.

When the diagnosis start flag (OK) output by the diagnosis start determination unit 902 is switched to the diagnosis start flag (NO), the diagnosis determination unit 908 compares the first diagnosis parameter with the first threshold value to determine that there is no abnormality (OK), or temporarily determine that there is an abnormality (NG) (determine that there is a possibility of an abnormality), and compares the second diagnosis parameter with the second threshold value to determine that there is no abnormality (OK), or formally determine that there is an abnormality (NG).

In a case where the diagnosis stage switching unit 909 does not output the diagnosis stage signal (1) to the diagnosis parameter calculation unit 906 and the threshold value calculation unit 907, when the space volume ($V_{C1}$) is applied as the first diagnosis parameter, the diagnosis determination unit 908 compares the space volume ($V_{C1}$) input from the diagnosis parameter calculation unit 906 with the space volume threshold value ($V_{TH1}$) input from the threshold value calculation unit 907, outputs a flag (OK) indicating that there is no abnormality to the diagnosis stage switching unit 909 when the space volume ($V_{C1}$) is equal to or larger than the space volume threshold value ($V_{TH1}$), and outputs a flag (NG) indicating a temporary determination that there is an abnormality to the diagnosis stage switching unit 909 when the space volume ($V_{C1}$) is smaller than the space volume threshold value ($V_{TH1}$).

Similarly, when the pressure ($P_{C1}$) is applied as the first diagnosis parameter, the diagnosis determination unit 908 compares the pressure ($P_{C1}$) input from the diagnosis parameter calculation unit 906 with the pressure threshold value ($P_{TH1}$) (first threshold value) input from the threshold value calculation unit 907, outputs the flag (OK) indicating that there is no abnormality to the diagnosis stage switching unit 909 when the pressure ($P_{C1}$) is equal to or larger than the pressure threshold value ($P_{TH1}$), and outputs the flag (NG) indicating the temporary determination that there is an abnormality to the diagnosis stage switching unit 909 when the pressure ($P_{C1}$) is smaller than the pressure threshold value ($P_{TH1}$).

Similarly, when the decrease rate ((d/dt)($P_{C1}$)) of the pressure ($P_{C1}$) is applied as the first diagnosis parameter, the diagnosis determination unit 908 compares the decrease rate ((d/dt)($P_{C1}$)) input from the diagnosis parameter calculation unit 906 with the decrease rate threshold value ((d/dt)($P_{TH1}$)) (first threshold value) input from the threshold value calculation unit 907, outputs the flag (OK) indicating that there is no abnormality to the diagnosis stage switching unit 909 when the decrease rate ((d/dt)($P_{C1}$)) is equal to or smaller than the decrease rate threshold value ((d/dt)($P_{TH1}$)), and outputs the flag (NG) indicating the temporary determination that there is an abnormality to the diagnosis stage switching unit 909 when the decrease rate ((d/dt)($P_{C1}$)) is larger than the decrease rate threshold value ((d/dt)($P_{TH1}$)).

In a case where the diagnosis stage switching unit 909 outputs the diagnosis stage signal (1) to the diagnosis parameter calculation unit 906 and the threshold value calculation unit 907, when the space volume ($V_{C2}$) is applied as the second diagnosis parameter, the diagnosis determination unit 908 compares the space volume ($V_{C2}$) input from the diagnosis parameter calculation unit 906 with the space volume threshold value ($V_{TH2}$) (second threshold value) input from the threshold value calculation unit 907, outputs the flag (OK) indicating that there is no abnormality to the diagnosis stage switching unit 909 when the space volume ($V_{C2}$) is equal to or larger than the space volume threshold value ($V_{TH2}$), and outputs the flag (NG) indicating the temporary determination that there is an abnormality to the diagnosis stage switching unit 909 when the space volume ($V_{C2}$) is smaller than the space volume threshold value ($V_{TH2}$).

Similarly, when the pressure ($P_{C2}$) is applied as the second diagnosis parameter, the diagnosis determination unit 908 compares the pressure ($P_{C2}$) input from the diagnosis parameter calculation unit 906 with the pressure threshold value ($P_{TH2}$) (second threshold value) input from the threshold value calculation unit 907, outputs the flag (OK) indicating that there is no abnormality to the diagnosis stage switching unit 909 when the pressure ($P_{C2}$) is equal to or larger than the pressure threshold value ($P_{TH2}$), and outputs the flag (NG) indicating the temporary determination that there is an abnormality to the diagnosis stage switching unit 909 when the pressure ($P_{C2}$) is smaller than the pressure threshold value ($P_{TH2}$).

Similarly, when the decrease rate ((d/dt)($P_{C2}$)) of the pressure ($P_{C2}$) is applied as the second diagnosis parameter, the diagnosis determination unit 908 compares the decrease rate ((d/dt)($P_{C2}$)) input from the diagnosis parameter calculation unit 906 with the decrease rate threshold value ((d/dt)($P_{TH2}$)) (second threshold value) input from the threshold value calculation unit 907, outputs the flag (OK) indicating that there is no abnormality to the diagnosis stage switching unit 909 when the decrease rate ((d/dt)($P_{C2}$)) is equal to or smaller than the decrease rate threshold value ((d/dt)($P_{TH2}$)), and outputs the flag (NG) indicating the temporary determination that there is an abnormality to the diagnosis stage switching unit 909 when the decrease rate ((d/dt)($P_{C2}$)) is larger than the decrease rate threshold value ((d/dt)($P_{TH2}$)).

When the pressure ($P_{C1}$, $P_{C2}$) reaches a prescribed lower limit value (value smaller than the first threshold value ($P_{TH1}$) and the second threshold value ($P_{TH2}$)) before the prescribed time (time t3–time t2) elapses after the outside air shutoff valve 41 is closed, the diagnosis determination unit 908 makes the temporary determination that there is an abnormality (NG).

The diagnosis stage switching unit 909 holds a diagnosis stage signal (0) in the initial state, and outputs the diagnosis stage signal (0) to the purge pump control unit 910.

When the flag (OK) is input from the diagnosis determination unit 908 in a state where the diagnosis stage signal (0) is output to the purge pump control unit 910, the diagnosis stage switching unit 909 outputs the diagnosis stage signal (0) to the diagnosis result determination unit 911.

When the flag (NG) is input from the diagnosis determination unit 908 in a state where the diagnosis stage signal (0) is held, the diagnosis stage switching unit 909 switches the held diagnosis stage signal (0) to the diagnosis stage signal (1), and outputs the diagnosis stage signal (1) to the diagnosis parameter calculation unit 906, the threshold value calculation unit 907, the purge pump control unit 910, and the diagnosis result determination unit 911.

When the flag (OK) is input from the diagnosis determination unit 908 in a state where the diagnosis stage signal (1) is held, the diagnosis stage switching unit 909 switches the held diagnosis stage signal (1) to the diagnosis stage signal (0), and outputs the diagnosis stage signal (0) to the purge pump control unit 910 and the diagnosis result determination unit 911.

When the flag (NG) is input from the diagnosis determination unit 908 in the state where the diagnosis stage signal (1) is held, the diagnosis stage switching unit 909 switches the held diagnosis stage signal (1) to a diagnosis stage signal (2), and outputs the diagnosis stage signal (2) to the purge pump control unit 910 and the diagnosis result determination unit 911.

The purge pump control unit 910 drives the output (rotation speed) of the purge pump 71 at a normal output (LOW) while the diagnosis stage signal (0) is input from the diagnosis stage switching unit 909. Here, the normal output (LOW) is an initial limit output necessary for supplying the vaporized fuel collected in the canister 3 to the engine 1.

When the diagnosis stage signal (1) is input from the diagnosis stage switching unit 909, the purge pump control unit 910 drives the output (rotation speed) of the purge pump 71 at a high output (HIGH) higher than the normal output (LOW).

When the output of the purge pump 71 is driven at the high output (HIGH), if the diagnosis stage signal (0) or the diagnosis stage signal (2) is input from the diagnosis stage switching unit 909, the purge pump control unit 910 returns the output (rotation speed) of the purge pump 71 to the normal output (LOW).

When the diagnosis stage signal (0) is input from the diagnosis stage switching unit 909, the diagnosis result determination unit 911 formally determines that there is no abnormality (OK) and outputs a flag (END) to the diagnosis permission condition determination unit 901.

When the diagnosis stage signal (1) is input from the diagnosis stage switching unit 909, the diagnosis result determination unit 911 determines to continue the diagnosis (CONT.) and outputs a flag (CONT.) to the diagnosis permission condition determination unit 901.

When the diagnosis stage signal (2) is input from the diagnosis stage switching unit 909, the diagnosis result determination unit 911 formally determines that there is an abnormality (NG) and outputs the flag (END) to the diagnosis permission condition determination unit 901.

When the flag (CONT.) is input from the diagnosis result determination unit 911, the diagnosis permission condition determination unit 901 starts the second abnormality determination. That is, when the flag (CONT.) is input from the diagnosis result determination unit 911, the diagnosis permission condition determination unit 901 switches the output flag (NO) to the flag (OK) immediately or after a prescribed time elapses, outputs the flag (OK) to the diagnosis start determination unit 902, the counter 903, and the outside air shutoff valve control unit 904, then switches the output flag (OK) to the flag (NO) after a prescribed time elapses, and output the flag (NO) to the counter 903 and the outside air shutoff valve control unit 904.

When the flag (END) is input from the diagnosis result determination unit 911, the diagnosis permission condition determination unit 901 stops the abnormality determination.

[Control Flow]

Figure 4:
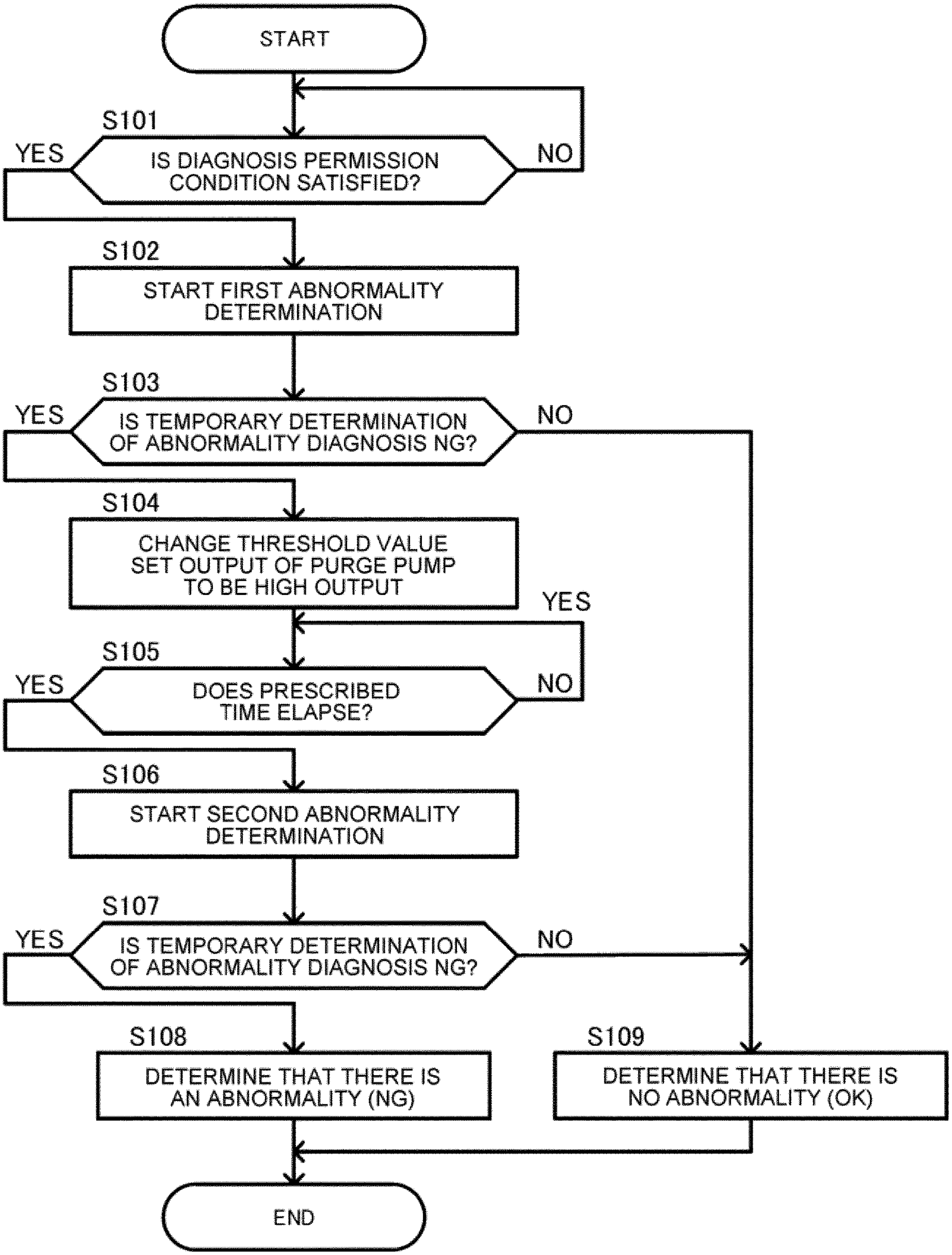
FIG. 4 is a control flowchart of the abnormality determination system for the purge system of the present embodiment.

FIG. 4 is a control flowchart of the abnormality determination system for the purge system of the present embodiment.

In step S101, the controller 9 (diagnosis permission condition determination unit 901) determines whether a diagnosis permission condition is satisfied, and when YES is determined, the process proceeds to step S102, and when NO is determined, the process remains in step S101. Here, whether the diagnosis permission condition is satisfied is determined based on whether the ignition signal (IGN) is input to the diagnosis permission condition determination unit 901.

In step S102, the controller 9 (diagnosis permission condition determination unit 901 and diagnosis start determination unit 902) starts the first abnormality determination.

In step S103, the controller 9 (diagnosis determination unit 908) determines whether a temporary determination that there is an abnormality (NG) is performed in the abnormality determination, and when YES is determined (the first diagnosis parameter is included in the second region), the process proceeds to step S104, and when NO is determined (the first diagnosis parameter is included in the first region), the process proceeds to step S109.

In step S104, the controller 9 (threshold value calculation unit 907 and purge pump control unit 910) switches the threshold value to be compared with the diagnosis parameter from the first threshold value (TH1) to the second threshold value (TH2), and sets the output of the purge pump 71 from the normal output (LOW) to the high output (HIGH).

In step S105, the controller 9 determines whether a prescribed time elapses since the output of the purge pump 71 is set from the normal output (LOW) to the high output (HIGH), and when YES is determined, the process proceeds to step S106, and when NO is determined, the process remains in step S105.

In step S106, the controller 9 (diagnosis permission condition determination unit 901 and diagnosis start determination unit 902) starts the second abnormality determination.

In step S107, the controller 9 (diagnosis determination unit 908) determines whether a temporary determination that there is an abnormality (NG) is performed in the abnormality determination, and when YES is determined (the second diagnosis parameter is included in a fourth region), the process proceeds to step S108, and when NO is determined (the second diagnosis parameter is included in a third region), the process proceeds to step S109.

In step S108, the controller 9 (diagnosis result determination unit 911) formally determines that there is an abnormality (NG) in the supply passage 10, and the process proceeds to END.

In step S109, the controller 9 (diagnosis result determination unit 911) formally determines that there is no abnormality (OK) in the supply passage 10, and the process proceeds to END.

[First Time Chart]

Figure 5:
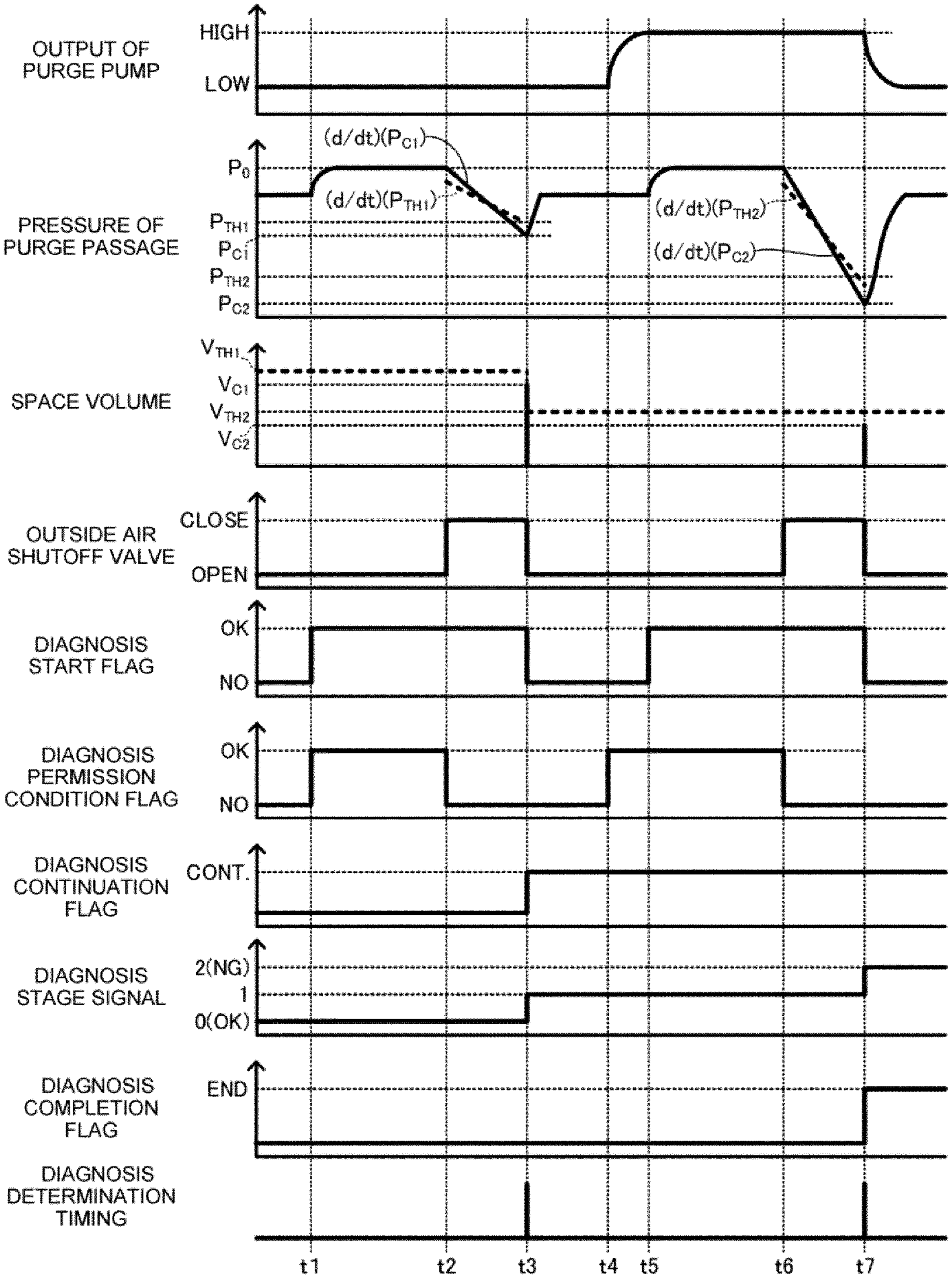
FIG. 5 is a time chart in a case where it is finally determined that there is an abnormality in the purge system in the abnormality determination system for the purge system of the present embodiment.

FIG. 5 is a time chart in a case where it is finally determined that there is an abnormality in the purge system in the abnormality determination system for the purge system of the present embodiment. In the initial state, the outside air shutoff valve 41 is opened, the output of the purge pump 71 is set to be the normal output (LOW), and the purge valve 72 is opened. The diagnosis stage switching unit holds the diagnosis stage signal (0).

At the time t1, when the diagnosis permission condition flag is switched from "NO" to "OK", the diagnosis start flag is also switched from "NO" to "OK", the opening of the purge valve 72 is also narrowed to the prescribed opening (NARROW), and the pressure of the purge passage 7 increases in a relatively short time. The pressure ($P_0$) is measured between the time t1 and the time t2.

At the time t2, when the diagnosis permission condition flag is switched from "OK" to "NO", the outside air shutoff valve 41 is shifted from an open state (OPEN) to a closed state (CLOSE). Accordingly, the pressure ($P_{C1}$) of the purge passage 7 (supply passage 10) monotonically decreases.

At the time t3, the pressure ($P_{C1}$) is measured when the diagnosis start flag is switched from "OK" to "NO", which is a first diagnosis determination timing.

Here, when the space volume ($V_{C1}$) is applied as the first diagnosis parameter, it is determined that the space volume ($V_{C1}$) calculated for a first time is smaller than the space volume threshold value ($V_{TH1}$) (first threshold value), and a first temporary determination that there is an abnormality (NG) is performed. When the pressure ($P_{C1}$) is applied as the first diagnosis parameter, it is determined that the pressure ($P_{C1}$) measured for a first time is smaller than the pressure threshold value ($P_{TH1}$) (first threshold value), and the first temporary determination that there is an abnormality (NG) is performed. When the decrease rate $((d/dt)(P_{C1}))$ of the pressure ($P_{C1}$) is applied as the first diagnosis parameter, it is determined that the decrease rate $((d/dt)(P_{C1}))$ calculated for a first time is larger than the decrease rate threshold value $((d/dt)(P_{TH1}))$, and the first temporary determination that there is an abnormality (NG) is performed.

According to the above determination, the diagnosis stage signal is switched from "0" to "1", and the flag (CONT.) indicating the continuation of the diagnosis is output to continue the diagnosis.

At the time t3, the outside air shutoff valve 41 changes from the closed state (CLOSE) to a released state (OPEN), the purge valve 72 also changes to an open state (OPEN), and the pressure ($P_C$) returns to the state before the time t1.

At a time t4, when the diagnosis permission condition flag is switched from "NO" to "OK" again, the output of the purge pump 71 is set from the normal output (LOW) to the high output (HIGH).

At a time t5, the diagnosis start flag is switched from "NO" to "OK", the opening of the purge valve 72 is also narrowed to the prescribed opening (NARROW), and the pressure of the purge passage 7 increases in a relatively short time. At the time t5, the output of the purge pump 71 increases from the time t3 and is driven at the high output (HIGH). The pressure ($P_0$) is measured again between the time t5 and a time t6.

At the time t6, when the diagnosis permission condition flag is switched from "OK" to "NO", the outside air shutoff valve 41 is shifted from the open state (OPEN) to the closed state (CLOSE). Accordingly, the pressure ($P_{C2}$) of the purge passage 7 (supply passage 10) monotonically decreases.

At a time t7, the pressure ($P_{C2}$) is measured when the diagnosis start flag is switched from "OK" to "NO", which is a second diagnosis determination timing.

Here, when the space volume ($V_{C2}$) is applied as the second diagnosis parameter, it is determined that the space volume ($V_{C2}$) calculated for a second time is smaller than the space volume threshold value ($V_{TH2}$) (second threshold value), and a second temporary determination that there is an abnormality (NG) is performed. When the pressure ($P_{C2}$) is applied as the second diagnosis parameter, it is determined that the pressure ($P_{C2}$) measured for a second time is smaller than the pressure threshold value ($P_{TH2}$), and the second temporary determination that there is an abnormality (NG) is performed. When the decrease rate ((d/dt)($P_{C2}$)) of the pressure ($P_{C2}$) is applied as the second diagnosis parameter, it is determined that the decrease rate ((d/dt)($P_{C2}$)) calculated for a second time is larger than the decrease rate threshold value ((d/dt)($P_{TH2}$)), and the second temporary determination that there is an abnormality (NG) is performed.

According to the above determination, the diagnosis stage signal is switched from "1" to "2", and the flag (END) indicating the diagnosis end is output to end the diagnosis. Since a final value of the diagnosis stage signal is "2", it is possible to formally determine that there is an abnormality (NG) in the purge system (supply passage 10).

At the time t3, the outside air shutoff valve 41 changes from the closed state (CLOSE) to the released state (OPEN), the purge valve 72 also changes to the open state (OPEN), and the pressure ($P_C$) returns to the state before the time t1.

Since the first temporary determination that there is an abnormality (NG) is performed at the time t3, the purge valve 72 may be maintained in a state (NARROW) in which the opening is narrowed to the prescribed opening in order to perform the second abnormality determination.

[Second Time Chart]

Figure 6:
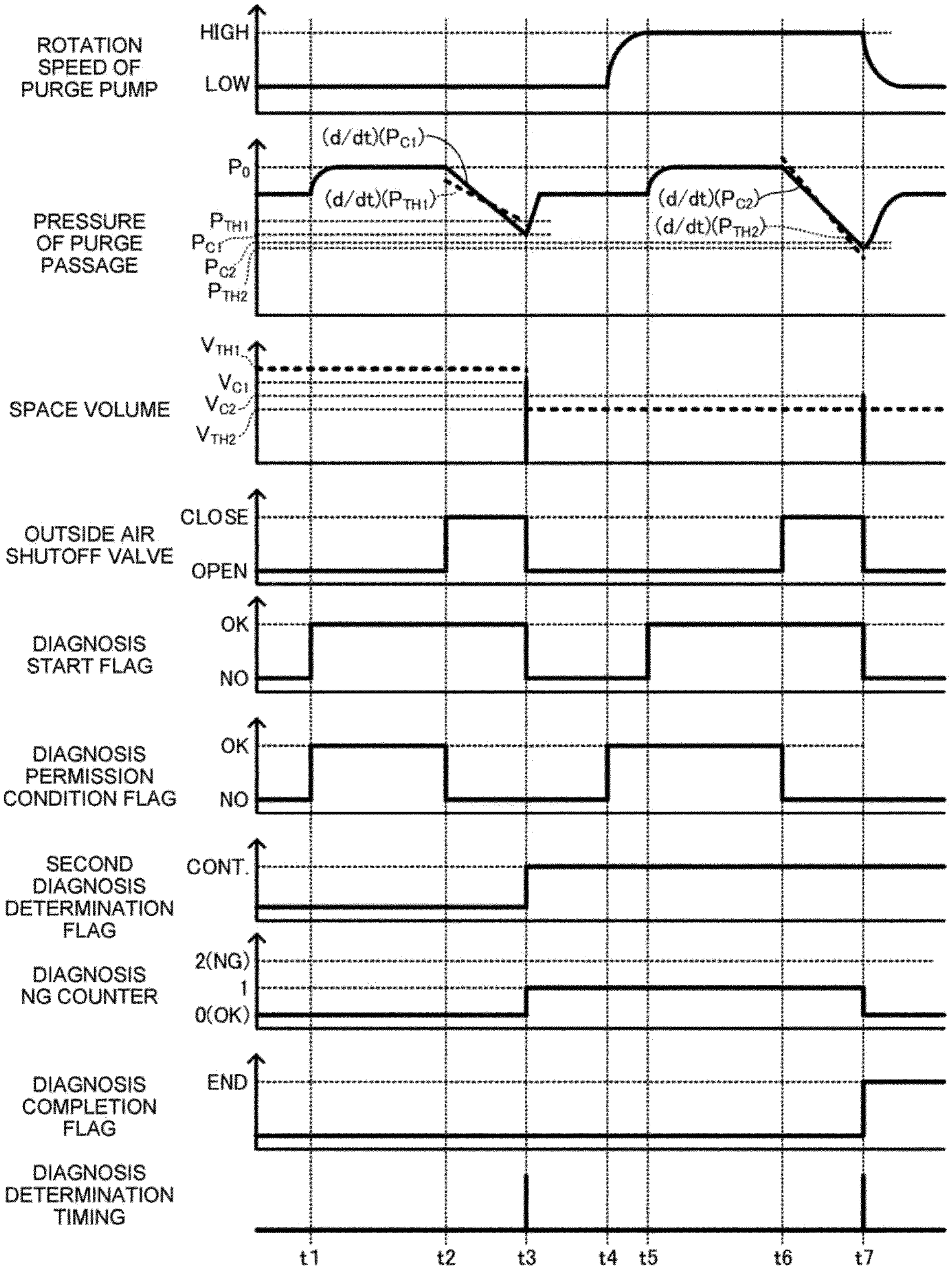
FIG. 6 is a time chart in a case where it is finally determined that there is no abnormality in the purge system in the abnormality determination system for the purge system of the present embodiment.

FIG. 6 is a time chart in a case where it is finally determined that there is no abnormality in the purge system in the abnormality determination system for the purge system of the present embodiment. An initial state and a state from the time t1 to the time t6 are the same as the states shown in FIG. 5.

At the time t7, the pressure ($P_{C2}$) is measured when the diagnosis start flag is switched from "OK" to "NO", which is the second diagnosis determination timing.

Here, when the space volume ($V_{C2}$) is applied as the second diagnosis parameter, it is determined that the space volume ($V_{C2}$) calculated for the second time is equal to or larger than the space volume threshold value ($V_{TH2}$) (second threshold value), and it is determined that there is no abnormality (OK). When the pressure ($P_{C2}$) is applied as the second diagnosis parameter, it is determined that the pressure ($P_{C2}$) measured for the second time is equal to or larger than the pressure threshold value ($P_{TH2}$) (second threshold value), and it is determined that there is no abnormality (OK). When the decrease rate ((d/dt)($P_{C2}$)) of the pressure ($P_{C2}$) is applied as the second diagnosis parameter, it is determined that the decrease rate ((d/dt)($P_{C2}$)) calculated for the second time is equal to or smaller than the decrease rate threshold value ((d/dt)($P_{TH2}$)), and it is determined that there is no abnormality (OK).

According to the above determination, the diagnosis stage signal is switched from "1" to "0", and the flag (END) indicating the diagnosis end is output to end the diagnosis. Since the final value of the diagnosis stage signal is "0", it is possible to formally determine that there is no abnormality (OK) in the purge system (supply passage 10).

[Effects of Present Embodiment]

The abnormality determination method for the purge system of the present embodiment is an abnormality determination method for a purge system, the purge system including a vapor passage 6 connected to a fuel tank 5, a canister 3 configured to collect vaporized fuel transmitted from the fuel tank 5 through the vapor passage 6, a purge passage 7 including a purge pump 71 that supplies the vaporized fuel absorbed in the canister 3 to an internal combustion engine (engine 1), and an outside air introduction passage 4 allowing the canister 3 to communicate with outside air and to which an outside air shutoff valve 41 is attached, the abnormality determination method being for determining an abnormality in the vapor passage 6 or the purge passage 7 in the purge system, the abnormality determination method including: estimating a first diagnosis parameter that is a physical quantity which is allowed to be estimated by closing the outside air shutoff valve 41 in a state where the purge pump 71 is driven, and that is allowed to be classified into a first region in which it is determined that there is no abnormality in the vapor passage 6 and the purge passage 7 and a second region in which it is determined that there is a possibility of an abnormality in the vapor passage 6 or the purge passage 7, with a first threshold value as a boundary; releasing the outside air shutoff valve 41 once, setting an output of the purge pump 71 to be a high output higher than an output during estimation of the first diagnosis parameter, and closing the outside air shutoff valve 41, when the first diagnosis parameter is included in the second region; estimating a second diagnosis parameter that is the physical quantity which is allowed to be estimated by closing the outside air shutoff valve 41 in a state where the output of the purge pump 71 is set to be the high output, and that is allowed to be classified into a third region in which it is determined that there is no abnormality in the vapor passage 6 and the purge passage 7 and a fourth region in which it is determined that there is an abnormality in the vapor passage 6 or the purge passage 7, with a second threshold value as a boundary; and determining that there is an abnormality in the vapor passage 6 or the purge passage 7 when the second diagnosis parameter is included in the fourth region.

According to the above method, in a first abnormality determination, it is determined that there is no abnormality in the vapor passage 6 and the purge passage 7 when the first diagnosis parameter is included in the first region, and it is determined that there is a possibility of an abnormality in the vapor passage 6 or the purge passage 7 when the first diagnosis parameter is included in the second region. Here, when it is determined that there is no abnormality (OK) in the first abnormality determination, since the output of the purge pump 71 is not increased, power consumption can be reduced accordingly. In a second abnormality determination, it is determined that there is no abnormality in the vapor passage 6 and the purge passage 7 when the second diagnosis parameter is included in the third region, and it is determined that there is an abnormality in the vapor passage 6 or the purge passage 7 when the second diagnosis parameter is included in the fourth region. In the second abnormality determination, the output of the purge pump 71 is increased, and thus a presence or absence of an abnormality in the vapor passage 6 and the purge passage 7 can be detected with high accuracy.

In the present embodiment, the physical quantity is a space volume ($V_C$) that is estimated based on a flow rate (F) of the purge pump 71 until a prescribed time elapses after the outside air shutoff valve 41 is closed in the state where the purge pump 71 is driven, and a difference between a pressure ($P_0$) of a portion of the purge passage 7 that is closer to the canister 3 than to the purge pump 71 before the outside air shutoff valve 41 is closed and the pressure ($P_C$) after the prescribed time elapses since the outside air shutoff valve 41 is closed, and the abnormality determination method further includes: determining that the first diagnosis parameter ($V_{C1}$) is included in the second region (there is a possibility of an abnormality in the vapor passage 6 or the purge passage 7) when the first diagnosis parameter ($V_{C1}$) is smaller than the first threshold value ($V_{TH1}$); and determining that the second diagnosis parameter ($V_{C2}$) is included in the fourth region (there is an abnormality in the vapor passage 6 or the purge passage 7) when the second diagnosis parameter ($V_{C2}$) is smaller than the second threshold value ($V_{TH2}$).

According to the above method, the space volume ($V_{C1}$) is used as the first diagnosis parameter and the space volume ($V_{C2}$) is used as the second diagnosis parameter in the abnormality determination, and thus a presence or absence of an abnormality in the supply passage 10 can be detected with higher accuracy.

In the present embodiment, the space volume ($V_C$) is calculated based on a ratio of the flow rate (F) to the difference ($P_0-P_C$)($K\times F/(P_0-P_C)$).

According to the above method, the space volume ($V_C$) can be easily calculated.

In the present embodiment, the physical quantity is a pressure ($P_C$) of a portion of the purge passage 7 that is closer to the canister 3 than to the purge pump 71 after a prescribed time elapses since the outside air shutoff valve 41 is closed in the state where the purge pump 71 is driven, and the abnormality determination method further includes: determining that the first diagnosis parameter ($P_{C1}$) is included in the second region (there is a possibility of an abnormality in the vapor passage 6 or the purge passage 7) when the first diagnosis parameter ($P_{C1}$) is smaller than the first threshold value ($P_{TH1}$); and determining that the second diagnosis parameter ($P_{C2}$) is included in the fourth region (there is an abnormality in the vapor passage 6 or the purge passage 7) when the second diagnosis parameter ($P_{C2}$) is smaller than the second threshold value ($P_{TH2}$).

According to the above method, the pressure ($P_{C1}$) is used as the first diagnosis parameter and the pressure ($P_{C2}$) is used as the second diagnosis parameter in the abnormality determination, and thus the presence or absence of the abnormality in the supply passage 10 can be detected using a simple method.

In the present embodiment, the physical quantity is a decrease rate ($(d/dt)(P_C)$) of a pressure ($P_C$) of a portion of the purge passage 7 that is closer to the canister 3 than to the purge pump 71 after the outside air shutoff valve 41 is closed in the state where the purge pump 71 is driven, and the abnormality determination method further includes: determining that the first diagnosis parameter ($(d/dt)(P_{C1})$) is included in the second region (there is a possibility of an abnormality in the vapor passage 6 or the purge passage 7) when the first diagnosis parameter ($(d/dt)(P_{C1})$) is larger than the first threshold value ($(d/dt)(P_{TH1})$); and determining that the second diagnosis parameter ($(d/dt)(P_{C2})$) is included in the fourth region (there is an abnormality in the vapor passage 6 or the purge passage 7) when the second diagnosis parameter ($(d/dt)(P_{C2})$) is larger than the second threshold value ($(d/dt)(P_{TH2})$).

According to the above method, the decrease rate ($(d/dt)(P_C)$) of the pressure ($P_C$) is used as the diagnosis parameter in the abnormality determination, and thus a timing of the abnormality determination can be advanced as compared with a case where the space volume ($V_C$) or the pressure ($P_C$) is applied as the diagnosis parameter.

In the present embodiment, the abnormality determination method further includes: in a case where the internal combustion engine (engine 1) is mounted on a vehicle, estimating the first diagnosis parameter by closing the outside air shutoff valve 41 when the internal combustion engine (engine 1) is driven and the vehicle is stopped, or when the internal combustion engine (engine 1) is driven and the vehicle is traveling.

According to the above method, the abnormality determination is performed not only when the vehicle is stopped but also when the vehicle is traveling, and thus it is possible to increase an opportunity to perform the abnormality determination.

In the present embodiment, the abnormality determination method further includes: prohibiting the estimation of the first diagnosis parameter when a fluctuation of the fuel (liquid fuel) in the fuel tank 5 is equal to or larger than a prescribed upper limit value.

According to the above method, an erroneous determination of the abnormality determination can be reduced.

In the present embodiment, the abnormality determination method further includes: setting the first threshold value ($V_{TH1}$, $P_{TH1}$, $(d/dt)(P_{TH1})$) and the second threshold value ($V_{TH2}$, $P_{TH2}$, $(d/dt)(P_{TH2})$ to be smaller as a filling rate of the fuel (liquid fuel) in the fuel tank 5 increases.

According to the above method, accuracy of the abnormality determination can be increased.

In the present embodiment, the abnormality determination method further includes: determining that there is an abnormality in the vapor passage 6 or the purge passage 7 when the pressure ($P_C$) reaches a prescribed lower limit value (pressure value smaller than the first threshold value ($P_{TH1}$) and the second threshold value ($P_{TH2}$) before the prescribed time (time t3−time t2) elapses since the outside air shutoff valve 41 is closed.

According to the above method, a processing load can be reduced.

The abnormality determination system for the purge system of the present embodiment is an abnormality determination system for a purge system, the purge system including a vapor passage 6 connected to a fuel tank 5, a canister 3 configured to collect vaporized fuel transmitted from the fuel tank 5 through the vapor passage 6, a purge passage 7 including a purge pump 71 that supplies the vaporized fuel absorbed in the canister 3 to an internal combustion engine (engine 1), and an outside air introduction passage 4 allowing the canister 3 to communicate with outside air and to which an outside air shutoff valve 41 is attached, the abnormality determination system being for determining an abnormality in the vapor passage 6 or the purge passage 7 in the purge system. A first diagnosis parameter is estimated that is a physical quantity which is allowed to be estimated by closing the outside air shutoff valve 41 in a state where the purge pump 71 is driven, and that is allowed to be classified into a first region in which it is determined that there is no abnormality in the vapor passage 6 and the purge passage 7 and a second region in which it is determined that there is a possibility of an abnormality in the vapor passage 6 or the purge passage 7, with a first threshold value as a boundary. The outside air shutoff valve 41 is released once, an output of the purge pump 71 is set to be a high output higher than an output during estimation of the first diagnosis parameter, and the outside air shutoff valve 41 is closed, when the first diagnosis parameter is included in the second region. A second diagnosis parameter is estimated that is the physical quantity which is allowed to be estimated by closing the outside air shutoff valve 41 in a state where the output of the purge pump 71 is set to be the high output, and that is allowed to be classified into a third region in which it is determined that there is no abnormality in the vapor passage 6 and the purge passage 7 and a fourth region in which it is determined that there is an abnormality in the vapor passage 6 or the purge passage 7, with a second threshold value as a boundary. It is determined that there is an abnormality in the vapor passage 6 or the purge passage 7 when the second diagnosis parameter is included in the fourth region.

According to the above configuration, in a first abnormality determination, it is determined that there is no abnormality in the vapor passage 6 and the purge passage 7 when the first diagnosis parameter is included in the first region, and it is determined that there is a possibility of an abnormality in the vapor passage 6 or the purge passage 7 when the first diagnosis parameter is included in the second region. Here, when it is determined that there is no abnormality (OK) in the first abnormality determination, since the output of the purge pump 71 is not increased, power consumption can be reduced accordingly. In a second abnormality determination, it is determined that there is no abnormality in the vapor passage 6 and the purge passage 7 when the second diagnosis parameter is included in the third region, and it is determined that there is an abnormality in the vapor passage 6 or the purge passage 7 when the second diagnosis parameter is included in the fourth region. In the second abnormality determination, the output of the purge pump 71 is increased, and thus a presence or absence of an abnormality in the vapor passage 6 and the purge passage 7 can be detected with high accuracy.

Although the embodiment of the present invention has been described above, the above embodiment is merely a part of application examples of the present invention, and is not intended to limit the technical scope of the present invention to the specific configurations of the above embodiment. The above embodiment can be combined as appropriate.

The invention claimed is:

1. An abnormality determination method for a purge system, the purge system including a vapor passage connected to a fuel tank, a canister configured to collect vaporized fuel transmitted from the fuel tank through the vapor passage, a purge passage including a purge pump that supplies the vaporized fuel absorbed in the canister to an internal combustion engine, and an outside air introduction passage allowing the canister to communicate with outside air and to which an outside air shutoff valve is attached, the abnormality determination method being for determining an abnormality in the vapor passage or the purge passage in the purge system, the abnormality determination method comprising:

determining a first value of a physical quantity by closing the outside air shutoff valve while the purge pump is driven at a first speed, classifying the physical parameter into a first range in which it is determined that there is no abnormality in the vapor passage and the purge passage or a second range in which it is determined that there is a possibility of an abnormality in the vapor passage or the purge passage, with a first threshold value as a boundary between the first range and the second range;

opening the outside air shutoff valve, when the physical parameter is in the second range, determining a second value of the physical quantity by closing the outside air shutoff valve while the purge pump is driven at a second speed higher than the first speed;

classifying the second value into a third range in which it is determined that there is no abnormality in the vapor passage and the purge passage or a fourth range in which it is determined that there is an abnormality in the vapor passage or the purge passage, with a second threshold value as a boundary between the third range and the fourth range; and determining that there is a clog in the vapor passage or the purge passage when the second value is in the fourth range.

2. The abnormality determination method for the purge system according to claim 1, wherein the physical quantity is a volume that is determined based on a flow rate of the purge pump until a prescribed time elapses after the outside air shutoff valve is closed while the purge pump is driven, and a difference between the pressure of a portion of the purge passage that is closer to the canister than to the purge pump before the outside air shutoff valve is closed and the pressure after the prescribed time elapses since the outside air shutoff valve is closed, and the abnormality determination method further comprises:

determining that the first value is in the second range when the first value is smaller than the first threshold value; and determining that the second value is in the fourth range when the second value is smaller than the second threshold value.

3. The abnormality determination method for the purge system according to claim 2, wherein the volume is calculated based on a ratio of the flow rate to the difference in pressure.

4. The abnormality determination method for the purge system according to claim 1, wherein the physical quantity is the pressure of a portion of the purge passage that is closer to the canister than to the purge pump after a prescribed time elapses since the outside air shutoff valve is closed while the purge pump is driven, and the abnormality determination method further comprises:

determining that the first value is in the second range when the first value is smaller than the first threshold value; and determining that the second value is included in the fourth range when the second value is smaller than the second threshold value.

5. The abnormally determination method for the purge system according to claim 4, further comprising:

determining that there is an abnormality in the vapor passage or the purge passage when the pressure reaches a prescribed lower limit value before the prescribed time elapses since the outside air shutoff valve is closed.

6. The abnormality determination method for the purge system according to claim 1, wherein the physical quantity is a decrease rate of the pressure of a portion of the purge passage that is closer to the canister than to the purge pump after the outside air shutoff valve is closed while the purge pump is driven, and the abnormality determination method further comprises:

determining that the first value is in the second range when the first value is larger than the first threshold value; and determining that the second value is in the fourth range when the second value is larger than the second threshold value.

7. The abnormality determination method for the purge system according to claim 1, further comprising:

in a case where the internal combustion engine is mounted on a vehicle, determining the first value by closing the outside air shutoff valve when the internal combustion engine is driven and the vehicle is stopped, or when the internal combustion engine is driven and the vehicle is traveling.

8. The abnormality determination method for the purge system according to claim 1, further comprising:

prohibiting the determination of the first value when a fluctuation of the level of the fuel in the fuel tank is equal to or larger than a prescribed upper limit value.

9. The abnormality determination method for the purge system according to claim 1, further comprising:

setting the first threshold value and the second threshold value to be smaller as an amount of the fuel in the fuel tank increases.

10. An abnormality determination system for a purge system, the purge system including a vapor passage connected to a fuel tank, a canister configured to collect vaporized fuel transmitted from the fuel tank through the vapor passage, a purge passage including a purge pump that supplies the vaporized fuel absorbed in the canister to an internal combustion engine, and an outside air introduction passage allowing the canister to communicate with outside air and to which an outside air shutoff valve is attached, the abnormality determination system being for determining an abnormality in the vapor passage or the purge passage in the purge system, comprising:

a controller configured for:

determining a first value of a physical quantity by closing the outside air shutoff valve while the purge pump is driven at a first speed, classifying the physical parameter into a first range in which it is determined that there is no abnormality in the vapor passage and the purge passage or a second-range in which it is determined that there is a possibility of an abnormality in the vapor passage or the purge passage, with a first threshold value as a boundary between the first range and the second range, opening the outside air shutoff valve, when the physical parameter is in the second range, determining a second value of the physical quantity by closing the outside air shutoff valve while the purge pump is driven at a second speed higher than the first speed, classifying the second value into a third range in which it is determined that there is no abnormality in the vapor passage and the purge passage or a fourth range in which it is determined that there is an abnormality in the vapor passage or the purge passage, with a second threshold value as a boundary between the third range and the fourth range, and determining that there is a clog in the vapor passage or the purge passage when the second value is in the fourth range.

* * * * *